United States Patent
Eronen et al.

(10) Patent No.: US 10,225,679 B2
(45) Date of Patent: Mar. 5, 2019

(54) DISTRIBUTED AUDIO MIXING

(71) Applicant: Nokia Technologies Oy, Espoo (FI)

(72) Inventors: Antti Eronen, Tampere (FI); Arto Lehtiniemi, Lempäälä (FI); Jussi Leppänen, Tampere (FI); Juha Arrasvuori, Tampere (FI)

(73) Assignee: Nokia Technology Oy, Espoo (FI)

( * ) Notice: Subject to any disclaimer, the term of this patent is extended or adjusted under 35 U.S.C. 154(b) by 0 days.

(21) Appl. No.: 15/788,004

(22) Filed: Oct. 19, 2017

(65) Prior Publication Data

US 2018/0139562 A1    May 17, 2018

(30) Foreign Application Priority Data

Oct. 21, 2016 (EP) .................... 16195060

(51) Int. Cl.
 *G06F 3/16* (2006.01)
 *H04S 7/00* (2006.01)
 *H04S 3/00* (2006.01)

(52) U.S. Cl.
 CPC ............. *H04S 7/302* (2013.01); *H04S 3/008* (2013.01); *H04S 7/30* (2013.01); *G06F 3/165* (2013.01); *H04S 7/307* (2013.01); *H04S 2400/01* (2013.01); *H04S 2400/11* (2013.01); *H04S 2400/13* (2013.01)

(58) Field of Classification Search
 CPC ...... H04S 7/302; H04S 3/008; H04S 2400/01; H04S 2400/13; H04S 2400/11; H04S 5/005; G06F 3/165
 See application file for complete search history.

(56) References Cited

U.S. PATENT DOCUMENTS

| | | | |
|---|---|---|---|
| 7,843,486 B1* | 11/2010 | Blair | H04M 3/568 348/14.01 |
| 2009/0286600 A1 | 11/2009 | Hideya | |
| 2012/0262536 A1 | 10/2012 | Chen et al. | |
| 2013/0094672 A1 | 4/2013 | Liang | |
| 2014/0379108 A1 | 12/2014 | Vesa et al. | |

OTHER PUBLICATIONS

European Application No. 16173269.8, "Distributed Audio Mixing", filed on Jun. 7, 2016, 23 pages.

(Continued)

*Primary Examiner* — James K Mooney

(74) *Attorney, Agent, or Firm* — Mintz Levin Cohn Ferris Glovsky and Popeo, P.C.

(57) ABSTRACT

A method is disclosed, which comprises receiving a plurality of audio signals representing audio from respective audio sources in a space; defining for each audio source a spatial audio field indicative of the propagation of its audio signals within the space. For a first audio source is defined a restricted zone within its spatial audio field. A first control signal may be received for changing the spatial audio field of a second audio source so that said spatial audio field is moved towards, and overlaps part of the restricted zone of the first audio source. Responsive to the first control signal, the method may comprise changing the spatial audio field of the second audio source so that there is no overlap with the restricted zone.

19 Claims, 15 Drawing Sheets

(56) References Cited

OTHER PUBLICATIONS

Pihlajamäki et al., "Synthesis of Spatially Extended Virtual Source With Time-frequency Decomposition of Mono Signals", Journal of the Audio Engineering Society (JAES), vol. 62, No. 7/8, Jul.-Aug. 2014, pp. 467-484.
"Panning (audio)", Wikipedia, Retrieved on Oct. 16, 2017, Webpage available at : https://en.wikipedia.org/wiki/Panning_(audio).
Shah et al., "Metrics for Measuring Ideation Effectiveness", Design Studies, vol. 24, No. 2, Mar. 2003, pp. 111-134.
Smith., "Idea-Generation Techniques: A Formulary of Active Ingredients", Journal of creative behavior, vol. 32, No. 2, Jun. 1998, pp. 107-133.
Smith, "Towards a logic of innovation", The International Handbook on Innovation, Dec. 2005. p. 347-365.
Extended European Search Report received for corresponding European Patent Application No. 16195060.5, dated Apr. 6, 2017, 6 pages.

\* cited by examiner

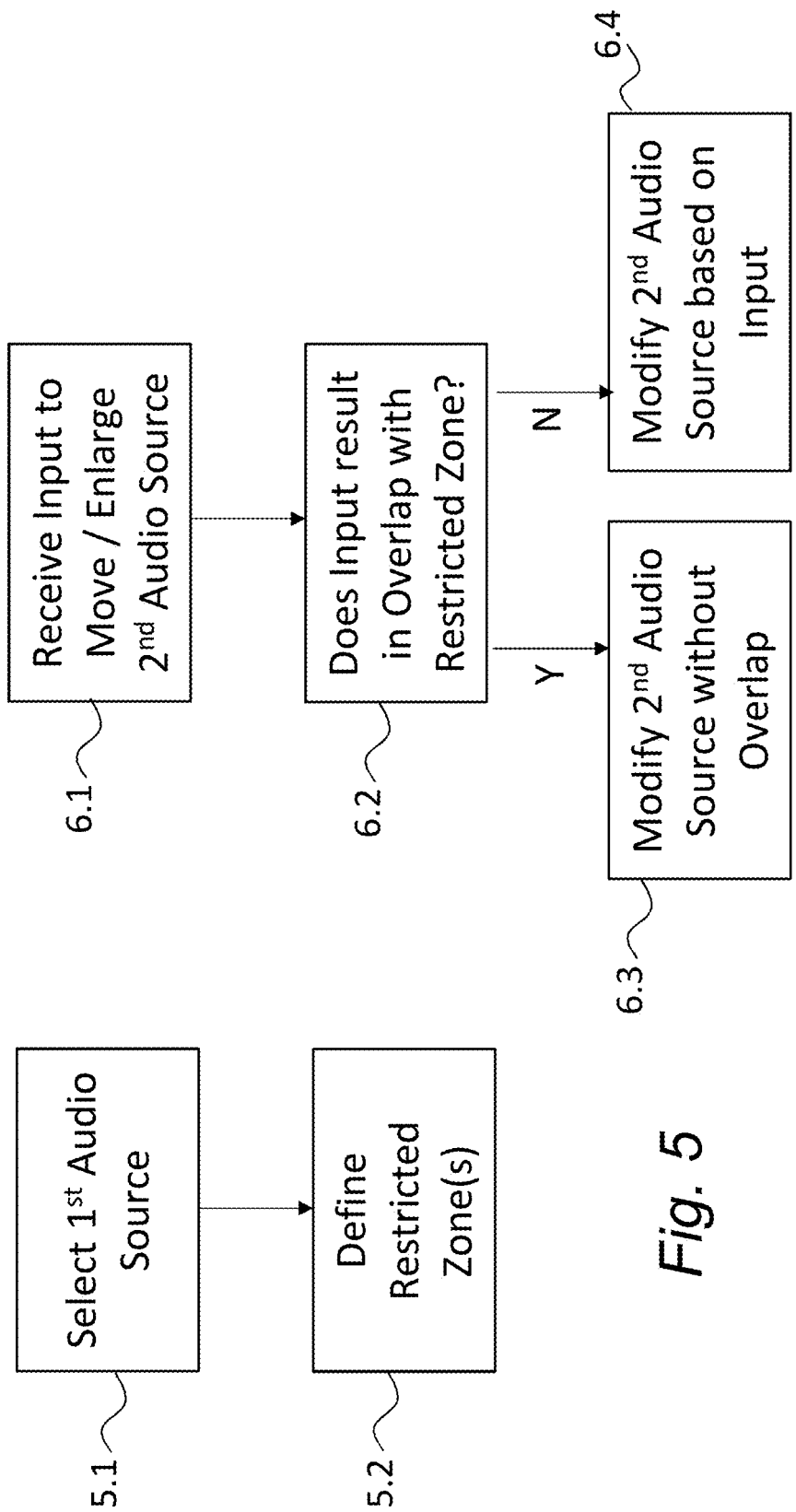

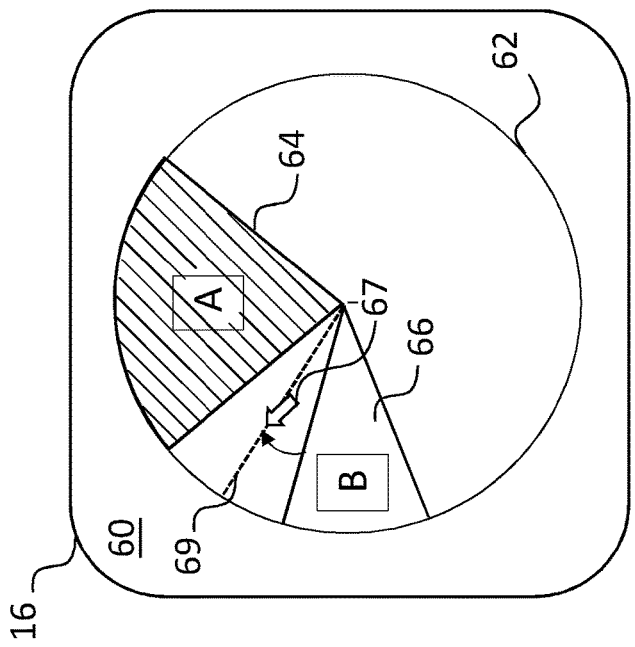 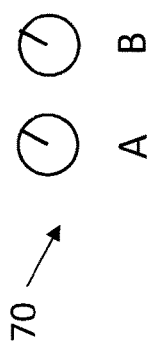
Fig. 7b
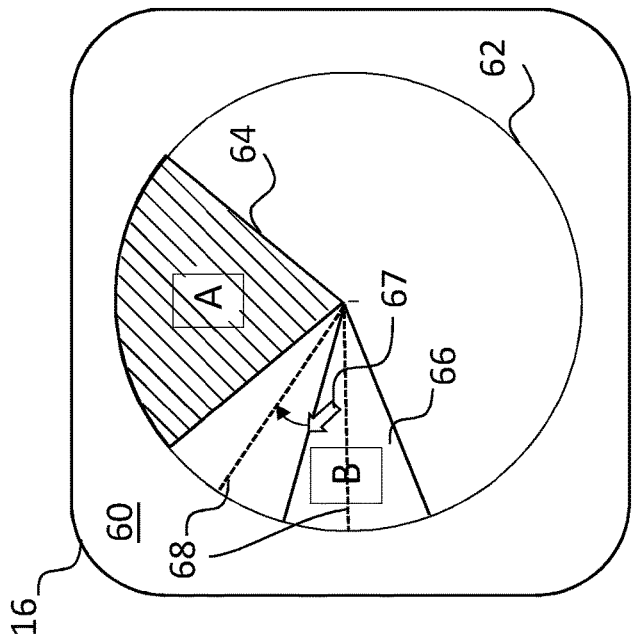 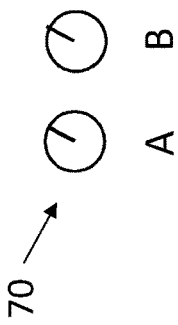
Fig. 7a

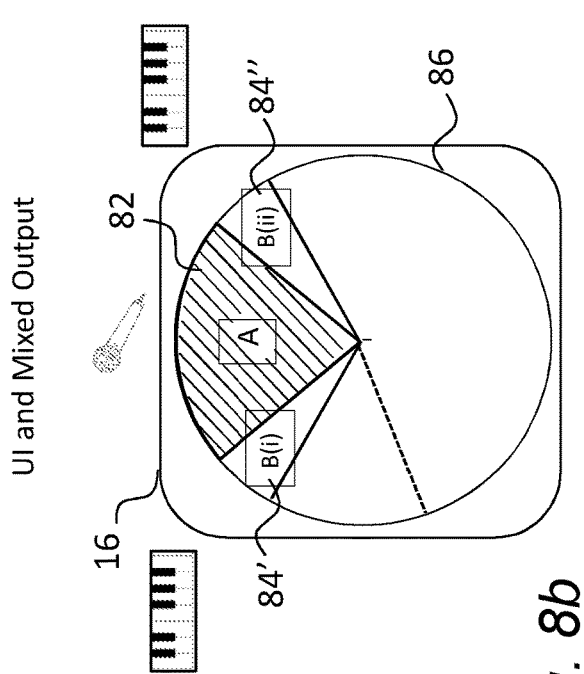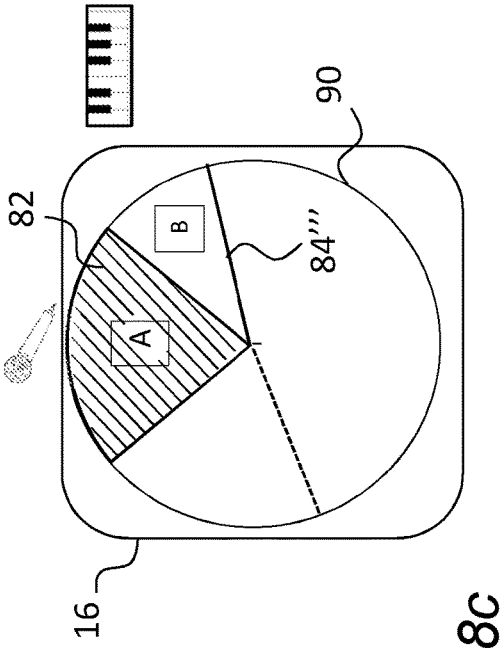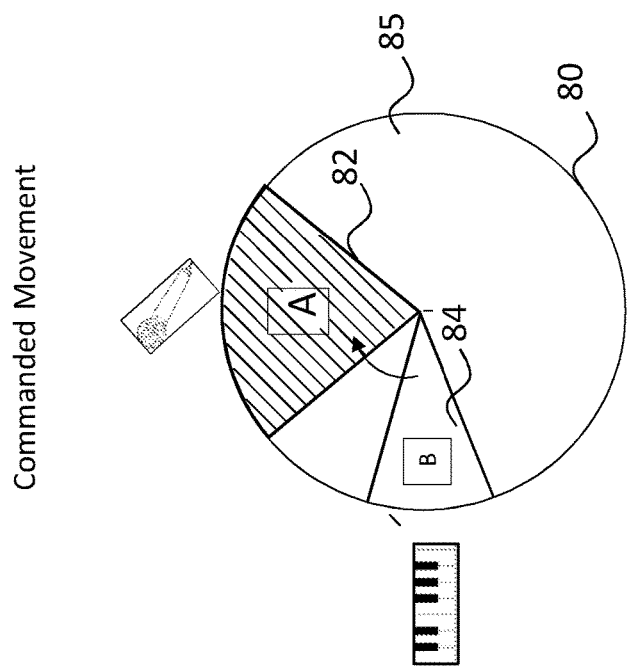
Fig. 8b
Fig. 8c
Fig. 8a

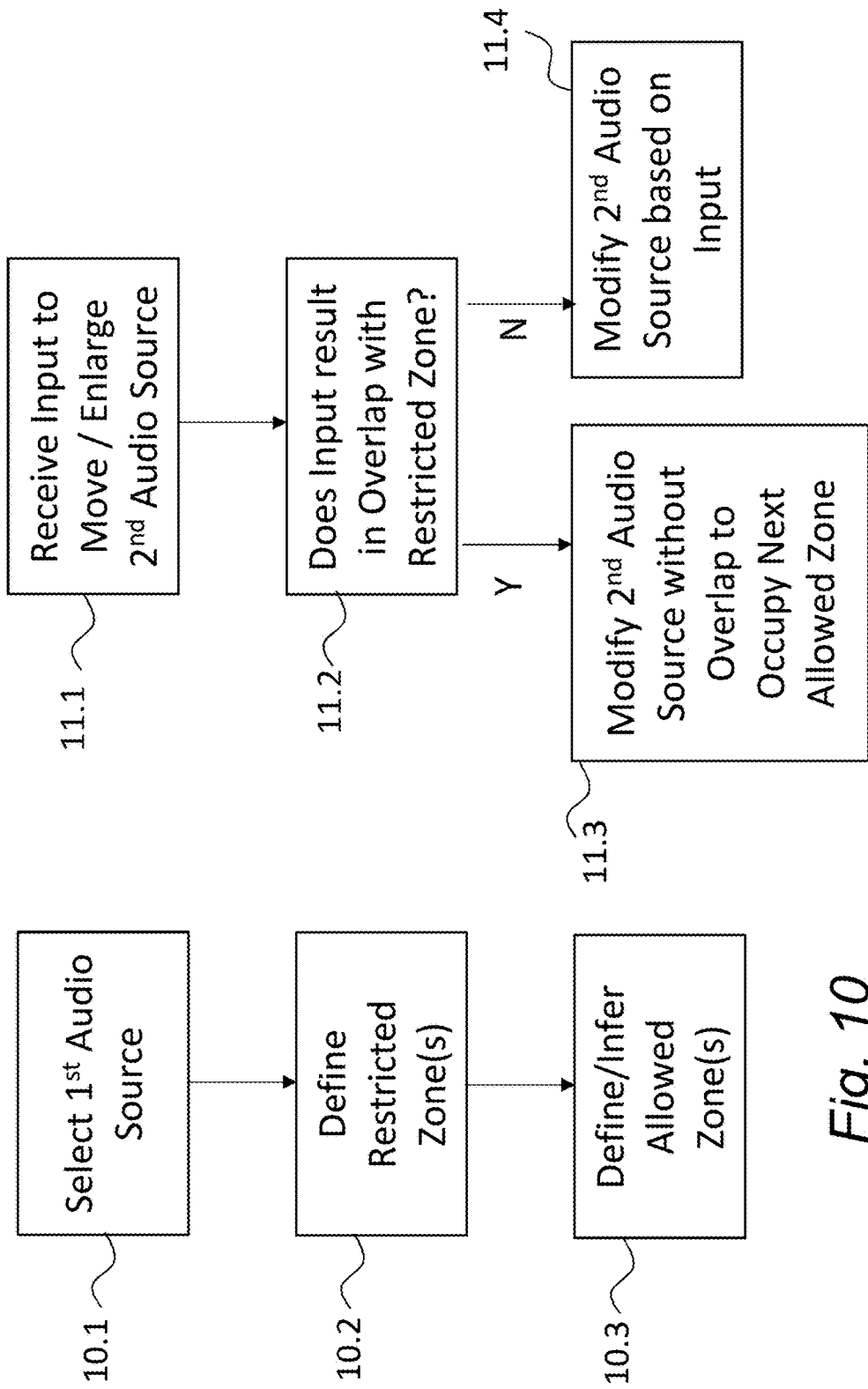

Commanded Movement

UI and Mixed Output

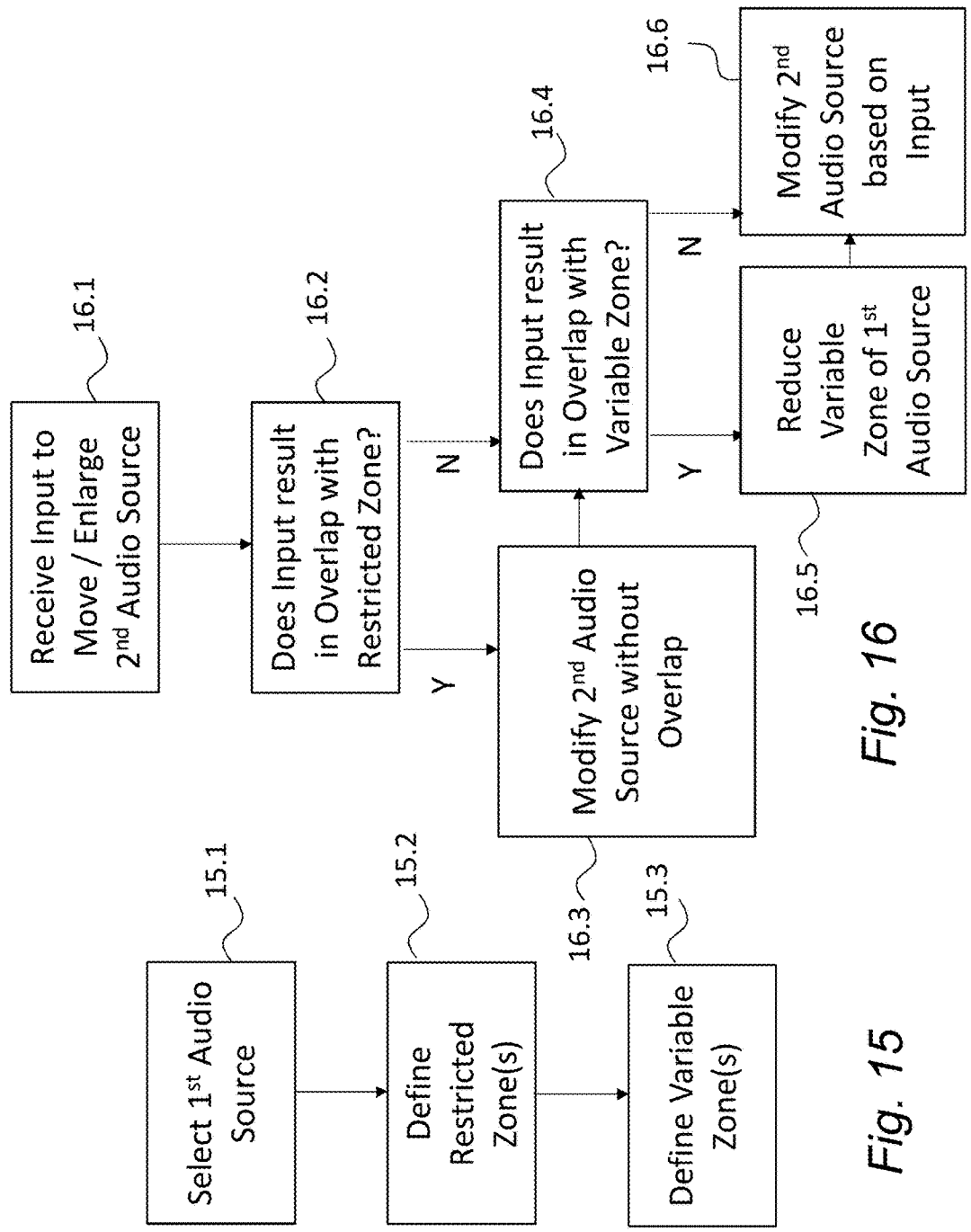

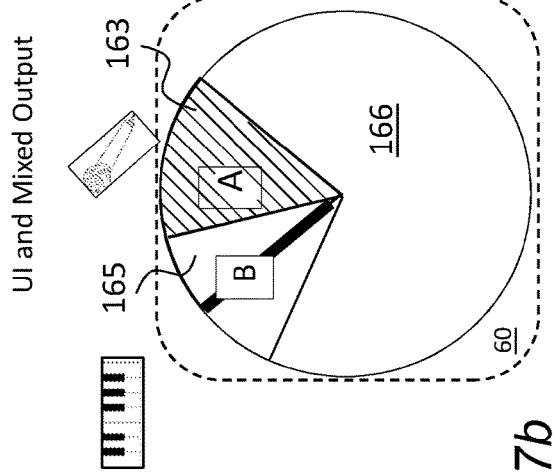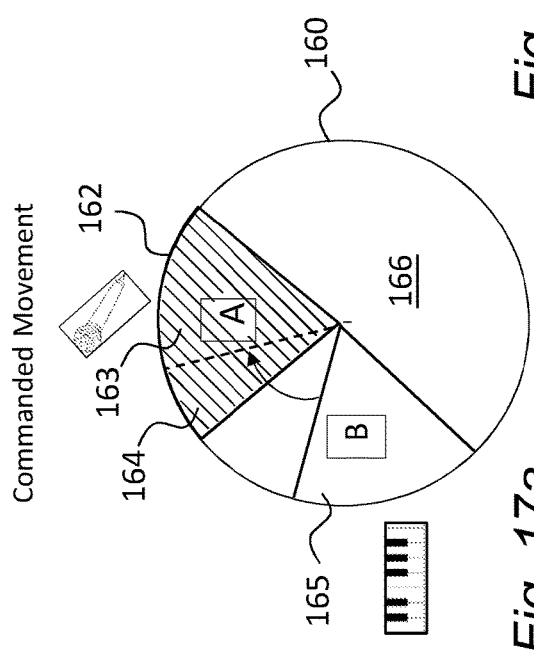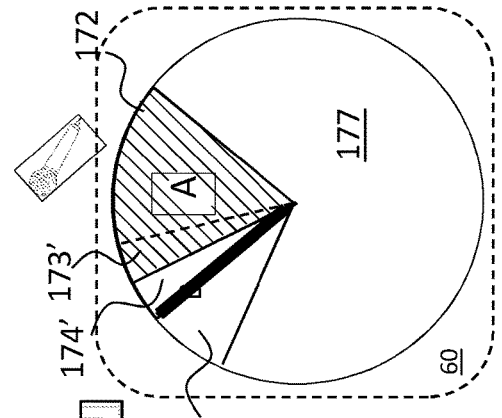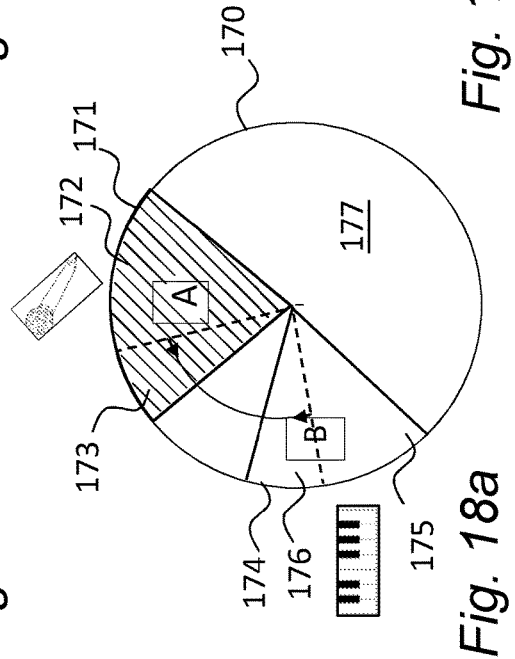
Fig. 17a
Fig. 17b
Fig. 18a
Fig. 18b

DISTRIBUTED AUDIO MIXING

FIELD

This specification relates generally to methods and apparatus for distributed audio mixing. The specification further relates to, but it not limited to, methods and apparatus for distributed audio capture, mixing and rendering of spatial audio signals to enable spatial reproduction of audio signals.

BACKGROUND

Spatial audio refers to playable audio data that exploits sound localisation. In a real world space, for example in a concert hall, there will be multiple audio sources, for example the different members of an orchestra or band, located at different locations on the stage. The location and movement of the sound sources is a parameter of the captured audio. In rendering the audio as spatial audio for playback such parameters are incorporated in the data using processing algorithms so that the listener is provided with an immersive and spatially oriented experience.

Spatial audio processing is an example technology for processing audio captured via a microphone array into spatial audio; that is audio with a spatial percept. The intention is to capture audio so that when it is rendered to a user the user will experience the sound field as if they are present at the location of the capture device.

An example application of spatial audio is in virtual reality (VR) whereby both video and audio data is captured within a real world space. In the rendered version of the space, i.e. the virtual space, the user, through a VR headset, may view and listen to the captured video and audio which has a spatial percept.

Rendering of captured audio may be complex and the quality of spatial audio produced in terms of listener experience may be degraded in current systems, for example in situations where one or more audio sources change position or move during capture.

SUMMARY

A first aspect of the specification provides a method comprising:
  receiving a plurality of audio signals representing audio from respective audio sources in a space;
  defining for each audio source a spatial audio field indicative of the propagation of its audio signals within the space;
  defining for a first audio source a restricted zone within its spatial audio field;
  receiving a first control signal indicative of a change in the spatial audio field of a second audio source so that said spatial audio field is moved towards, and overlaps part of the restricted zone of the first audio source; and
  responsive to the first control signal, changing the spatial audio field of the second audio source so that there is no overlap with the restricted zone for at least some audio signal frequencies.

The first control signal may be received responsive to a user input for spatially repositioning the spatial audio field of the second audio source.

The first control signal may be received responsive to a user input for enlarging the spatial audio field of the second audio source.

The first control signal may be received responsive to detection of a predetermined characteristic of the second audio source, e.g. a volume increase.

The method may comprise, responsive to receiving the first control signal, at least part of the spatial audio field of the second audio source jumping over the restricted zone to occupy an allowed zone on the other side. Here, only the overlapping part of the spatial audio field of the second audio source may jump over the restricted zone to occupy the allowed zone, or all of the spatial audio field of the second audio source may jump over the restricted zone to occupy the allowed zone irrespective of the amount of overlap. The allowed zone may be a space adjacent the restricted zone in the direction of movement. A plurality of spatially-separated, allowed zones may be defined in a respective priority order, and the method may comprise, responsive to receiving the control signal, the spatial audio field of the second audio source occupying two or more allowed zones in priority order.

The method may comprise:
defining for the first audio source a first variable zone, adjacent the restricted zone; and wherein responsive to the first control signal changing the said audio field of the second audio source to overlap at least part of the variable zone, the first spatial audio field within said first variable zone may be reduced in size.

The method may comprise defining for the second audio source a second variable zone, and wherein the spatial audio fields within both the first and second variable zones are reduced in size. The reduction within the first and second variable zones may be substantially equal.

The spatial audio field of the second audio source may be changed so that there is no overlap with the restricted zone for all audio frequencies.

The restricted zone may be defined in respect of one or more predetermined frequency ranges, and the spatial audio field of the second audio source may be changed so that audio signals within said frequency ranges do not overlap and audio signals with other frequencies may overlap.

The method may comprise generating a user interface for output to a display system which presents in graphical form the changed spatial audio field.

The method may comprise generating a virtual space for user interaction, which virtual space comprises the changed spatial audio field.

According to another aspect, there is provided a method comprising:
  (a) receiving a plurality of audio signals representing audio from respective audio sources in a space;
  (b) defining for each audio source a spatial audio field indicative of the propagation of its audio signals within the space;
  (c) defining for a first audio source (i) a restricted zone and (ii) a variable zone, both within the spatial audio field;
  (d) receiving a first control input indicative of a change in the spatial audio field of a second audio source so that said spatial audio field is moved towards, and overlaps, at least part of the variable zone of the first audio source; and
  (e) responsive to the first control input, reducing the variable zone of the first audio source so that the overlapped part is replaced by the spatial audio field of the second audio source.

Another aspect of the specification provides a computer program comprising instructions that when executed by a computer apparatus control it to perform any of the above methods.

A further aspect of the specification provides apparatus configured to perform any of the above methods.

According to a still further aspect, the specification describes an apparatus comprising: at least one processor and at least one memory including computer program code, which when executed by the at least one processor, causes the apparatus to perform a method comprising:
  receiving a plurality of audio signals representing audio from respective audio sources in a space;
  defining for each audio source a spatial audio field indicative of the propagation of its audio signals within the space;
  defining for a first audio source a restricted zone within its spatial audio field;
  receiving a first control signal indicative of a change in the spatial audio field of a second audio source so that said spatial audio field is moved towards, and overlaps part of the restricted zone of the first audio source; and
  responsive to the first control signal, changing the spatial audio field of the second audio source so that there is no overlap with the restricted zone for at least some audio signal frequencies.

The first control signal may be received responsive to a user input for spatially repositioning the spatial audio field of the second audio source.

The first control signal may be received responsive to a user input for enlarging the spatial audio field of the second audio source.

The first control signal may be received responsive to detection of a predetermined characteristic of the second audio source, e.g. a volume increase.

The computer program code, when executed by the at least one processor, may cause the apparatus to perform: responsive to receiving the first control signal, at least part of the spatial audio field of the second audio source jumping over the restricted zone to occupy an allowed zone on the other side. Here, only the overlapping part of the spatial audio field of the second audio source may jump over the restricted zone to occupy the allowed zone, or all of the spatial audio field of the second audio source may jump over the restricted zone to occupy the allowed zone irrespective of the amount of overlap. The allowed zone may be a space adjacent the restricted zone in the direction of movement. A plurality of spatially-separated, allowed zones may be defined in a respective priority order, and the method may comprise, responsive to receiving the control signal, the spatial audio field of the second audio source occupying two or more allowed zones in priority order.

The computer program code, when executed by the at least one processor, may cause the apparatus to perform: defining for the first audio source a first variable zone, adjacent the restricted zone; and
wherein responsive to the first control signal changing the said audio field of the second audio source to overlap at least part of the variable zone, the first spatial audio field within said first variable zone may be reduced in size.

The computer program code, when executed by the at least one processor, may cause the apparatus to perform: defining for the second audio source a second variable zone, and wherein the spatial audio fields within both the first and second variable zones are reduced in size. The reduction within the first and second variable zones may be substantially equal.

The spatial audio field of the second audio source may be changed so that there is no overlap with the restricted zone for all audio frequencies.

The restricted zone may be defined in respect of one or more predetermined frequency ranges, and the spatial audio field of the second audio source may be changed so that audio signals within said frequency ranges do not overlap and audio signals with other frequencies may overlap.

The computer program code, when executed by the at least one processor, may cause the apparatus to perform: generating a user interface for output to a display system which presents in graphical form the changed spatial audio field.

The computer program code, when executed by the at least one processor, may cause the apparatus to perform: generating a virtual space for user interaction, which virtual space comprises the changed spatial audio field.

According to another aspect, the specification describes an apparatus comprising:
at least one processor and at least one memory including computer program code, which when executed by the at least one processor, causes the apparatus to perform a method comprising:
  (a) receiving a plurality of audio signals representing audio from respective audio sources in a space;
  (b) defining for each audio source a spatial audio field indicative of the propagation of its audio signals within the space;
  (c) defining for a first audio source (i) a restricted zone and (ii) a variable zone, both within the spatial audio field;
  (d) receiving a first control input indicative of a change in the spatial audio field of a second audio source so that said spatial audio field is moved towards, and overlaps, at least part of the variable zone of the first audio source; and
  (e) responsive to the first control input, reducing the variable zone of the first audio source so that the overlapped part is replaced by the spatial audio field of the second audio source.

A further aspect provides apparatus comprising:
  means for receiving a plurality of audio signals representing audio from respective audio sources in a space;
  means for defining for each audio source a spatial audio field indicative of the propagation of its audio signals within the space;
  means for defining for a first audio source a restricted zone within its spatial audio field;
  means for receiving a first control signal indicative of a change in the spatial audio field of a second audio source so that said spatial audio field is moved towards, and overlaps part of the restricted zone of the first audio source; and
  means for responsive to the first control signal, changing the spatial audio field of the second audio source so that there is no overlap with the restricted zone for at least some audio signal frequencies.

A further aspect provides apparatus comprising:
  (a) means for receiving a plurality of audio signals representing audio from respective audio sources in a space;
  (b) means for defining for each audio source a spatial audio field indicative of the propagation of its audio signals within the space;
  (c) means for defining for a first audio source (i) a restricted zone and (ii) a variable zone, both within the spatial audio field;
  (d) means for receiving a first control input indicative of a change in the spatial audio field of a second audio source so that said spatial audio field is moved towards, and overlaps, at least part of the variable zone of the first audio source; and (e) means for, responsive to the first control input, reducing the variable zone of the first audio source so that the overlapped part is replaced by the spatial audio field of the second audio source.

According to yet another aspect, the specification describes a computer-readable medium having computer-readable code stored thereon, the computer-readable code, when executed by at least one processor, cause performance of at least:

receiving a plurality of audio signals representing audio from respective audio sources in a space;

defining for each audio source a spatial audio field indicative of the propagation of its audio signals within the space;

defining for a first audio source a restricted zone within its spatial audio field;

receiving a first control signal indicative of a change in the spatial audio field of a second audio source so that said spatial audio field is moved towards, and overlaps part of the restricted zone of the first audio source; and responsive to the first control signal, changing the spatial audio field of the second audio source so that there is no overlap with the restricted zone for at least some audio signal frequencies.

According to a fifth aspect, the specification describes a computer-readable medium having computer-readable code stored thereon, the computer-readable code, when executed by at least one processor, cause performance of at least:
at least one processor and at least one memory including computer program code, which when executed by the at least one processor, causes the apparatus to perform a method comprising:

(a) receiving a plurality of audio signals representing audio from respective audio sources in a space;

(b) defining for each audio source a spatial audio field indicative of the propagation of its audio signals within the space;

(c) defining for a first audio source (i) a restricted zone and (ii) a variable zone, both within the spatial audio field;

(d) receiving a first control input indicative of a change in the spatial audio field of a second audio source so that said spatial audio field is moved towards, and overlaps, at least part of the variable zone of the first audio source; and (e) responsive to the first control input, reducing the variable zone of the first audio source so that the overlapped part is replaced by the spatial audio field of the second audio source.

BRIEF DESCRIPTION OF THE DRAWINGS

Embodiments will now be described, by way of non-limiting example, with reference to the accompanying drawings, in which:

FIG. 5 is a flow diagram showing method steps for defining one or more restricted zones for an audio source according to an embodiment;

FIG. 6 is a flow diagram showing method steps responsive to received input to move an audio source in relation to another audio source according to an embodiment;

FIG. 7a and FIG. 7b are schematic views of a user interface used, respectively, to pan and enlarge the audio field of an audio source according to an embodiment;

FIG. 8a, FIG. 8b, and FIG. 8c are schematic top-plan views showing how panning of an audio field to overlap another audio field is processed according to embodiments;

FIG. 10 is a flow diagram showing method steps for defining one or more restricted zones for an audio source and one or more allowed zones according to embodiments;

FIG. 11 is a flow diagram showing method steps responsive to received input to move an audio source in relation to another audio source where multiple allowed zones are provided according to embodiments;

FIG. 15 is a flow diagram showing method steps for defining one or more restricted zones for an audio source and one or more variable zones according to embodiments;

FIG. 16 is a flow diagram showing method steps responsive to received input to move an audio source in relation to another audio source where one or more variable zones are provided according to embodiments;

FIG. 17a and FIG. 17b are schematic top-plan views showing how panning of an audio field to overlap the variable zone of another audio field is processed according to embodiments;

FIG. 18a and FIG. 18b are schematic top-plan views showing how panning of an audio field with its own variable zone to overlap the variable zone of another audio field is processed according to embodiments;

DETAILED DESCRIPTION OF EMBODIMENTS

Embodiments herein relate generally to systems and methods relating to the capture, mixing and rendering of spatial audio data for playback. In particular, the embodiments relate to systems and methods in which there are multiple audio sources in which their respective audio fields may move over time, whether by translation, rotation, enlargement or shrinking etc.

Each audio source generates respective audio signals and, in some embodiments, positioning information for use by the system.

An example application is in a VR capture and rendering system in which video is also captured and rendered to provide an immersive user experience. Nokia's OZO® VR camera is used as an example of a VR capture device which comprises a microphone array to provide a spatial audio signal, but it will be appreciated that the embodiments are not limited to VR applications nor the use of microphone arrays at the capture point. Local microphones or instrument pickups may be employed, for example.

Figure 1:
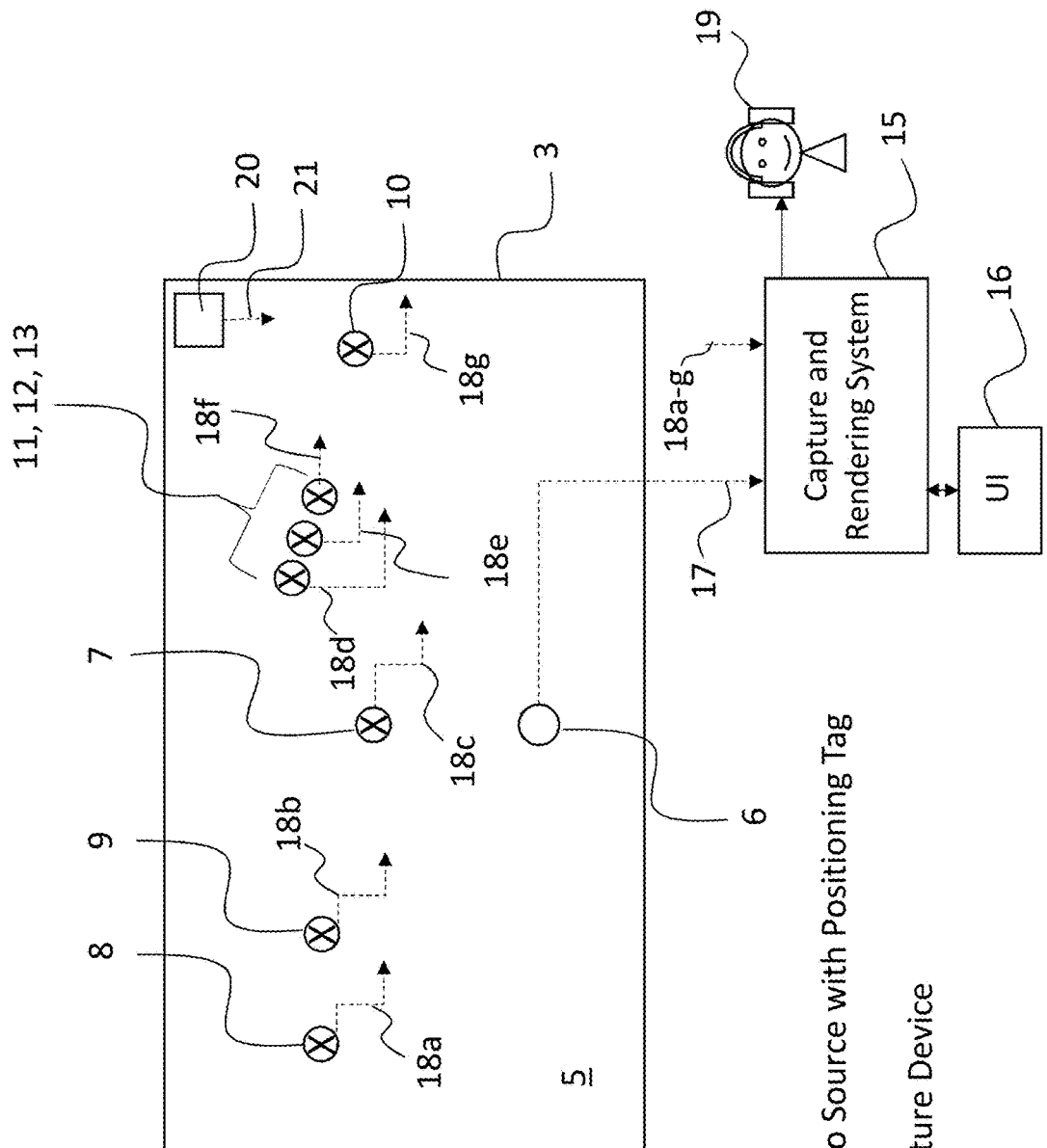
FIG. 1 is a schematic representation of a distributed audio capture scenario, including use of a rendering apparatus according to embodiments.

Referring to FIG. 1, an overview of a VR capture scenario 1 is shown together with a first embodiment capture, mixing and rendering system (CRS) 15 with associated user interface 16. The Figure shows in plan-view a real world space 3 which may be for example a concert hall or other music venue. The CRS 15 is applicable to any real world space, however. A VR capture device 6 for video and spatial audio capture may be supported on a floor 5 of the space 3 in front of multiple audio sources, in this case a band; the position of the VR capture device 6 is known, e.g. through predetermined positional data or signals derived from a positioning tag on the VR capture device. The VR capture device 6 in this example may comprise a microphone array configured to provide spatial audio capture.

The band may be comprised of multiple members each of which has an associated external microphone or (in the case of guitarists) a pick-up feed providing audio signals. Each may therefore be termed an audio source for convenience. In other embodiments, other types of audio source may be used. The audio sources in this example comprise a lead vocalist 7, a drummer 8, lead guitarist 9, bass guitarist 10, and three members of a choir or backing singers 11, 12, 13, which members are spatially close together in a group.

As well as having an associated microphone or audio feed, the audio sources 7-13 carry a positioning tag which may be any module capable of indicating through data its respective spatial position to the CRS 15. For example the positioning tag may be a high accuracy indoor positioning (HAIP) tag which works in association with one or more HAIP locators 20 within the space 3. HAIP systems use Bluetooth Low Energy (BLE) communication between the tags and the one or more locators 20. For example, there may be four HAIP locators mounted on, or placed relative to, the VR capture device 6. A respective HAIP locator may be to the front, left, back and right of the VR capture device 6. Each tag sends for example BLE signals from which the HAIP locators derive the tag, and therefore, audio source location.

In general, such direction of arrival (DoA) positioning systems are based on (i) a known location and orientation of the or each locator, and (ii) measurement of the DoA angle of the signal from the respective tag towards the locators in the locators' local co-ordinate system. Based on the location and angle information from one or more locators, the position of the tag may be calculated using geometry.

The CRS 15 is a processing system having an associated user interface (UI) 16 which will explained in further detail below. As shown in FIG. 1, it receives as input from the VR capture device 6 spatial audio and video data, and positioning data, through a signal line 17. Alternatively, the positioning data may be received from the HAIP locator 20. The CRS 15 also receives as input from each of the audio sources 7-13 audio data and positioning data from the respective positioning tags, or the HAIP locator 20, through separate signal lines 18a-g. The CRS 15 generates spatial audio data for output to a user device 19, such as a VR headset with video and audio output.

The input audio data may be raw microphone signals from the VR capture device 6 and/or one or more external microphones. The input audio data may be in the multi microphone signal format, such as the raw eight signal input from the OZO VR camera, if used for the VR capture device 6. The output data may be multichannel audio in loudspeaker format, e.g. stereo signals, 4.0 signals, 5.1 signals, Dolby Atmos® signals or the like. In some embodiments, the output data could be binaural format audio, e.g. for headphone listening.

Figure 2:
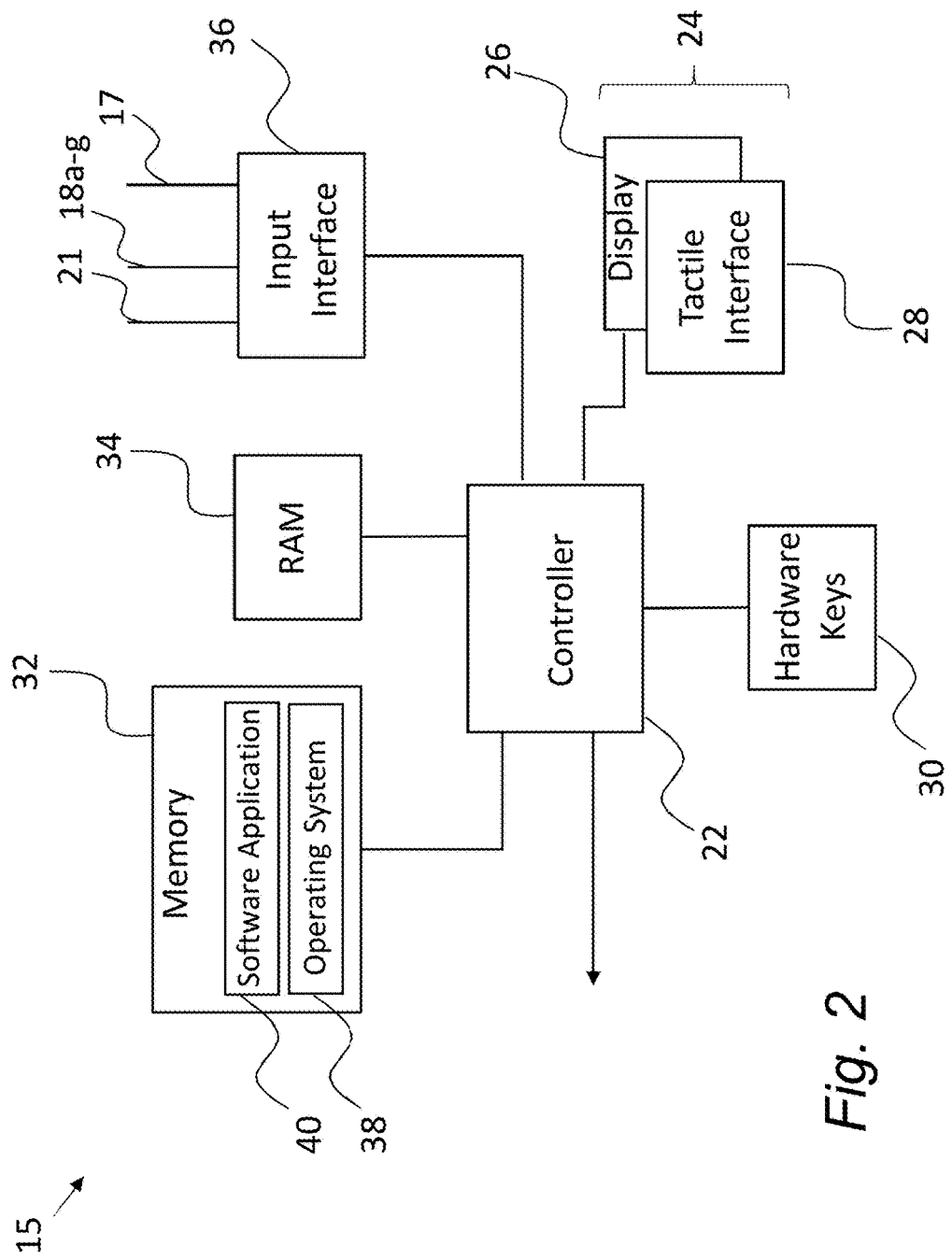
FIG. 2 is a schematic diagram illustrating components of the FIG. 1 rendering apparatus.

FIG. 2 shows an example schematic diagram of components of the CRS 15. The CRS 15 has a controller 22, a touch sensitive display 24 comprised of a display part 26 and a tactile interface part 28, hardware keys 30, a memory 32, RAM 34 and an input interface 36. The controller 22 is connected to each of the other components in order to control operation thereof. The touch sensitive display 24 is optional, and as an alternative a conventional display may be used with the hardware keys 30 and/or a mouse peripheral used to control the CRS 15 by conventional means.

The memory 32 may be a non-volatile memory such as read only memory (ROM) a hard disk drive (HDD) or a solid state drive (SSD). The memory 32 stores, amongst other things, an operating system 38 and software applications 40. The RAM 34 is used by the controller 22 for the temporary storage of data. The operating system 38 may contain code which, when executed by the controller 22 in conjunction with RAM 34, controls operation of each of hardware components of the terminal.

The controller 22 may take any suitable form. For instance, it may be a microcontroller, plural microcontrollers, a processor, or plural processors.

In embodiments herein, the software application 40 is configured to provide video and distributed spatial audio capture, mixing and rendering to generate a VR environment, or virtual space, including the rendered spatial audio. In some embodiments, only spatial audio may be provided without the need for video.

The software application 40 also provides the UI 16 shown in FIG. 1, through its output to the display 24 and receives user input, for example which generates a user input signal, through the tactile interface 28 or other input peripherals such as the hardware keys 30 or a mouse (not shown). One or more mixing controls may alternatively, or additionally, be provided as the input peripherals. For example, a rotatable knob may be associated with each audio source for controlling some aspect of the audio generated by that audio source. The mixing stage may be performed manually through the UI 16, through one or more other input peripherals, or all or part of said mixing stage may be performed automatically. The software application 40 may render the virtual space, including the spatial audio, using known signal processing techniques and algorithms based on the mixing stage.

The input interface 36 receives video and audio data from the VR capture device 6, such as Nokia's OZO® device on signal line 17, and audio data from each of the audio sources 7-13 on signal lines 18a-g. The input interface 36 also receives the positioning data from (or derived from) the positioning tags on each of the VR capture device 6 and the audio sources 7-13, or from the HAIP locator 20 on signal line 21, from which may be made an accurate determination of their respective positions in the real world space 3.

The software application 40 may be configured to operate in any of real-time, near real-time or even offline using pre-stored captured data.

The software application 40 is arranged to avoid or at least mitigate issues of unwanted audio masking when the rendered data is being consumed by a user. In this context, audio masking is the perceived effect of sounds from two or more audio sources overlapping. If a user is positioned in the virtual world at a location where there is spatial audio overlap, then one louder sound may interfere with, or block, a quieter sound. The rendered output may as a result be overwhelming and distracting.

Each audio source emitting a sound will have an associated spatial audio field (hereafter "audio field") which is the two or three-dimensional space over which its audio signals propagate at a given time. For ease of explanation, we will illustrate operation with respect to two-dimensional audio fields in top-plan view.

An audio field for a given audio source may change over time. For example, the audio field may move in correspondence with an audio source moving. If a musical artist is walking across a stage, and passes in front of another artist, then their respective audio fields will move in correspondence and may overlap with respect to a consuming user's position in the virtual space.

Additionally, or alternatively, a director/mixer may manually move or pad the audio field to suit a particular application or user experience.

Additionally, or alternatively, an audio field may be enlarged without the audio source necessarily moving. This may occur if the volume of the audio source increases. Additionally, or alternatively, a director/mixer may widen the audio field to suit a particular application or user experience.

These examples may be collectively termed as audio field movement in this context because there is a spatial change from a current state. The movement may be caused by user input and/or through automatic adjustment. The following examples focus on movement due to user input, but automatic adjustment may result from the sound source nearing the camera and/or an algorithm whereby if the amplitude of an audio source exceeds a threshold, it is then made wider rather than louder.

Figure 3B:
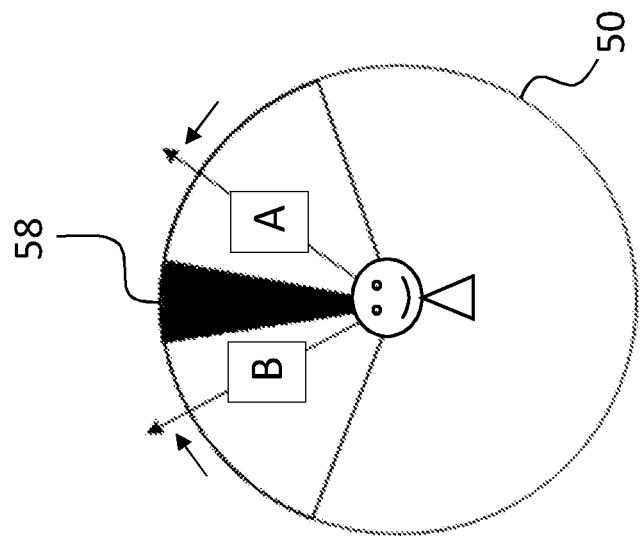
FIG. 3a and FIG. 3b are schematic top-plan views of a space having, respectively, two separated audio fields and two merged audio fields due to movement.
Figure 3A:
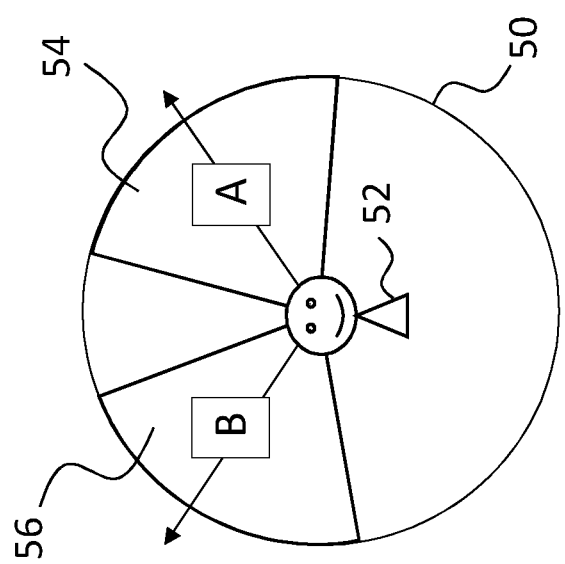

Referring to FIG. 3a and FIG. 3b, an example of a masking scenario is represented. A two-dimensional spatial area 50 indicates the overall audio field around a user's current position 52. Referring to FIG. 3a, two audio sources A, B are positioned with respective azimuth angles of approximately 30° and −30° to produce respective audio fields 54, 56 which indicate the direction of audio signal propagation and which do not overlap. If the audio fields 54, 56 are panned (rotated) relative to one another, as shown in FIG. 3b, overlap may occur resulting in an interference or masking zone 58 which may produce unwanted effects.

Therefore, in some embodiments, the software application 40 permits definition of a restricted zone within an audio source's audio field. In a subsequent stage, a commanded movement of another source's audio field to an overlapping position on the restricted zone is not permitted, which may be for all frequencies of the moved audio field or for one or more subsets of frequencies or frequency ranges of the moved audio field. Rather, the other audio field may be modified in some other way that will not produce an overlap and therefore will avoid or mitigate masking. The word "zone" may refer to any definable area of two or three-dimensional space. The word 'within' does not exclude the case where the entire audio field is defined as a restricted zone for the respective audio source.

The manner in which the modification is performed may take various forms.

For example, the moved audio field may be reduced in size to avoid overlap. For example, the other audio field may be reduced in size to avoid overlap. For example, the moved audio field may be returned to its original position to avoid overlap. For example, all or part of the moved audio field may skip or jump over the restricted zone into a so-called allowed zone. For example, in some embodiments, a restricted zone may be associated with one or more frequencies or frequency ranges, and the moved audio field may be modified in accordance with any of the above to avoid audio signals with said frequencies overlapping (although other frequencies may be allowed to overlap).

An allowed zone may be any part of the overall audio field outside of a restricted zone. The moved audio field may skip over the restricted zone and occupy some or all of the next available allowed zone in the direction of movement, for example. As further movement is commanded the moved audio field may occupy multiple allowed zones. Multiple allowed zones may be ordered in priority, e.g. so that a first allowed zone is first occupied, and then a second allowed zone and so on as further panning or enlargement is commanded.

As indicated above, a commanded movement may be provided in the form of a signal to the mixing stage of the CRS 15. The signal may result from manual inputs from a director/mixer or may be generated automatically.

In some embodiments, the software application 40 additionally or alternatively permits definition of one or more variable zones which may be associated with one or more audio sources. A variable zone is a zone in which an existing audio field may expand into or may be reduced in size to accommodate directed movement of another audio field. Accordingly, a variable zone may or may not be within an existing audio field.

Figure 4:
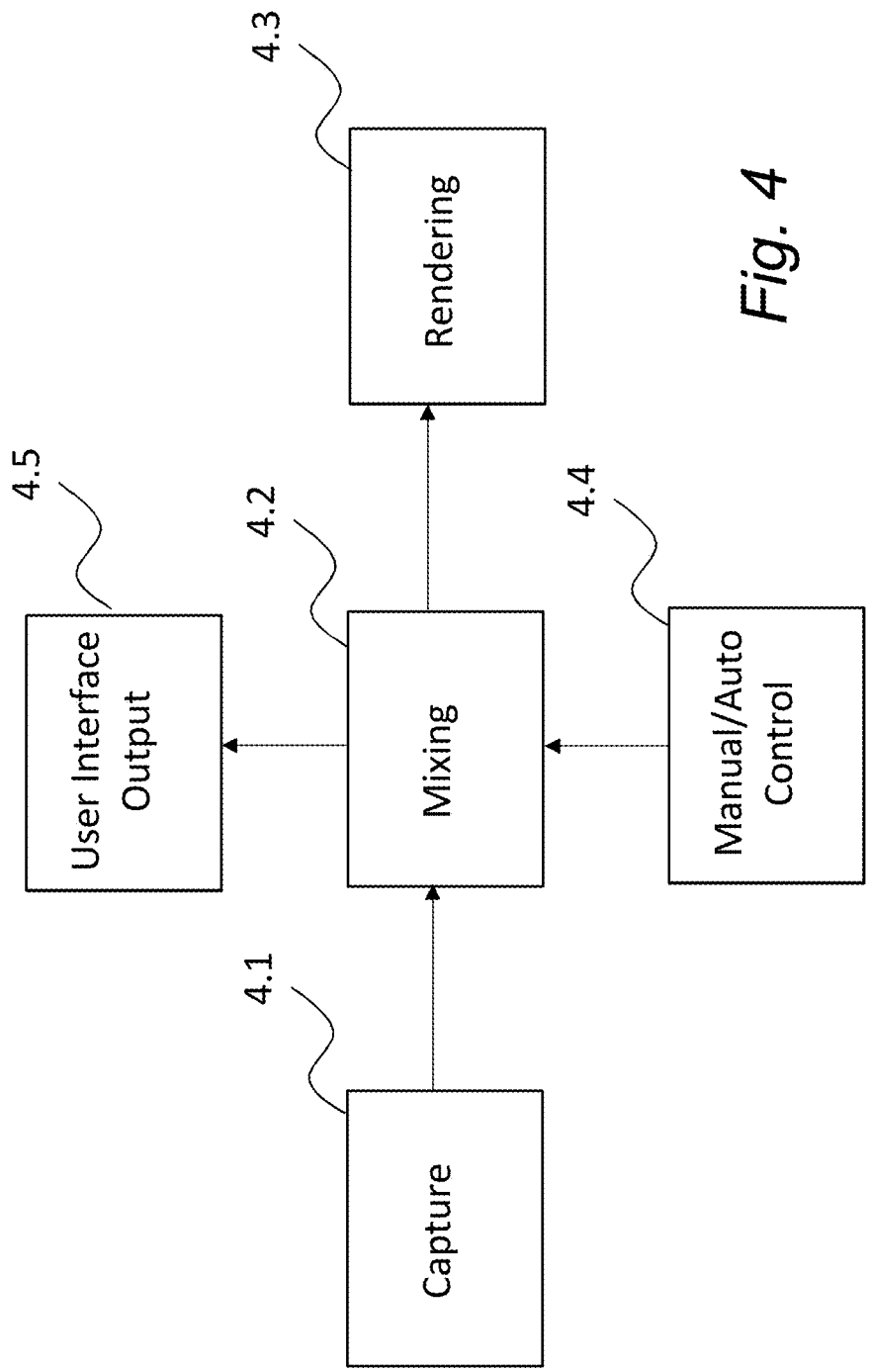
FIG. 4 is a flow diagram showing method steps of audio capture, mixing and rendering according to an embodiment.

FIG. 4 shows an overview flow diagram of the capture, mixing and rendering stages of software application 40. The mixing and rendering stages may be combined. First, video and audio capture is performed in step 4.1; next mixing is performed in step 4.2, followed by rendering in step 4.3. Mixing (step 4.2) may be dependent on a manual or automatic control step 4.4 which generates the control signal for the mixer. Automatic control may be based on attributes of the captured video and/or audio.

In the embodiments below, it is assumed that manual control is used to move one or more audio sources, either through the touch sensitive display 24 or using one or more mixing controls. Other attributes may be used.

Step 4.5 indicates the user interface output which provides real or near-real time visual feedback of the mixed output which will result from the commanded movement based on the operation of the software application 40.

Examples of how the mixing step 4.2 may be performed by the software application 40 will now be described.

FIG. 5 shows an overview of the processing steps that are performed by the software application 40 to define one or more restricted zones. In a first step 5.1, a first audio source is selected. In a second step, one or more restricted zones are defined for the selected first audio source, which may occupy part or all of the audio field. The process may be repeated for one or more further audio sources.

FIG. 6 shows an overview of the subsequent processing steps performed by the software application 40 in response to a control signal indicating commanded movement. In a first step 6.1, an input signal is received to move (which may comprise one or more of translation, rotation, enlargement etc.) the audio field of a second audio source. In step 6.2 it is determined if the input signal will result in an overlap with the restricted zone of the first audio source. If so, in step 6.3, the audio field of the second audio source is modified without overlap. If not, in step 6.4, the audio field of the second audio source is modified in accordance with the input signal.

The said modification in steps 6.3, 6.4 may comprise a real or near real-time visualisation that is presented on the user interface 16. The visualisation may not therefore correspond to the commanded movement if overlap has been determined. A further step may be required to effect rendering of the mixed audio to allow the director/mixer to make additional modifications.

FIG. 7a and FIG. 7b show example output from the user interface 16 which is useful for understanding subsequent visualisations.

Referring to FIG. 7a, the displayed output 60 shows a visualisation of the overall audio field 62 in top plan view within which a first audio source A has an associated audio field 64 all of which is defined as a restricted zone 64. A second audio source B is shown spaced from the first audio source A with an associated audio field 66 which does not currently overlap. Rotational movement of one or both audio fields 64, 66 may be effected by clicking a mouse or trackball pointer 67 on one of the audio fields and dragging it in either direction. In this case, rotation of the second audio source B towards the first audio source A is indicated, with dotted lines 68 indicating said rotation.

Referring to FIG. 7b, enlargement or expansion of one or both audio fields 64, 66 may be effected by clicking a mouse or trackball pointer 67 on the edge of one of the audio fields and dragging it in either direction. In this case, enlargement of the second audio source B towards the first audio source A is indicated with the dotted line 69.

Additionally, or alternatively, one or more mixer knobs 70 may be used to effect panning and/or enlargement. In some embodiments, panning and enlargement may be performed at the same time.

Examples of the step 6.3 modification will now be described with reference to examples.

FIG. 8a shows an overall audio field 80 in top plan view having first and second audio fields 82, 84 from respective audio sources A, B. For example, the first audio source A may be a lead vocalist and the second audio source may be an instrument. In this example, the entire first audio field 82 is considered a restricted zone. Any part of the audio field 85 outside of this is considered an allowed zone. Using the user interface 16, the director/mixer may request rotation of the second audio field 84 to an overlapping position on the first audio field 82 as indicated by the arrow.

One form of modification in step 6.3 may involve moving the overlapping part of the second audio field 84 to the other side of the first audio field 82, as shown in an example of the user interface output 86 in FIG. 8b. It will be seen that the non-overlapping part 84' remains on the original side of the first audio field 82, with the overlapping part 84" automatically jumping or skipping to the other side. This effect may be presented in real-time on the user interface as the director/mixer effects the panning motion. FIG. 8c shows the effect of further panning, in which all of the second audio field 84 is moved to the other side, shown as 84'''.

Thus, the user interface output 86 may indicate in real-time the effect of the commanded movement and this may then be processed into the rendered output for consumption by a user without the masking effect that might otherwise result.

In the above example, a partial overlap will result in that overlapping area or volume of the jumping to the other side. In some embodiments, any amount of overlap, even partial, may result in the FIG. 8c visualisation so that, in the user interface output 90, the second audio field 84 is not divided but is moved entirely to the other side of the first audio field 82, shown as 84".

Figure 9B:
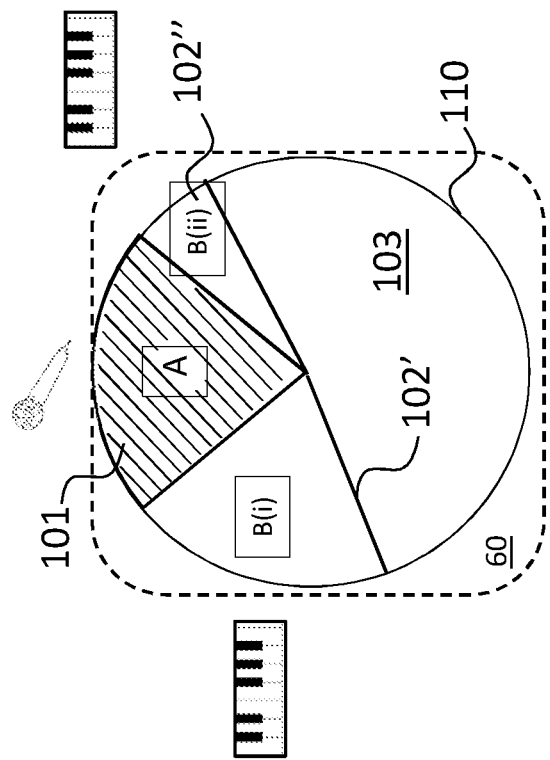
FIG. 9a and FIG. 9b are schematic top-plan views showing how enlargement of an audio field to overlap another audio field is processed according to embodiments.
Figure 9A:
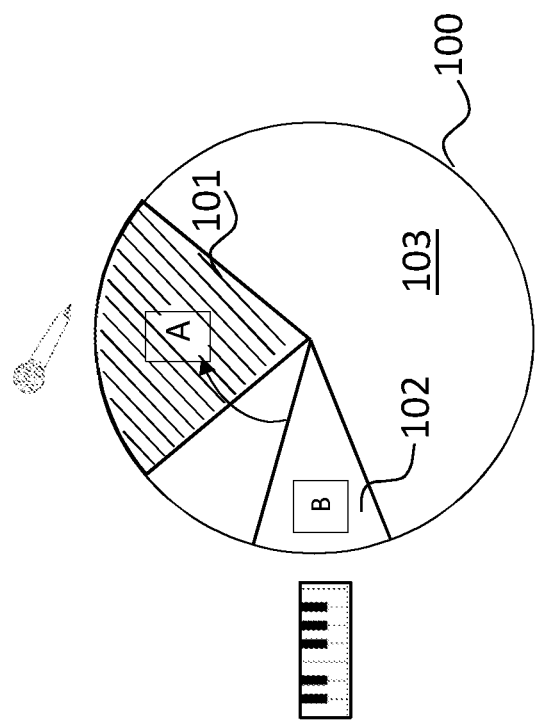

In a further example, FIG. 9a and FIG. 9b show modification in response to enlargement of an audio field. Similar to FIG. 8a, an overall audio field 100 has first and second audio fields 101, 102 from respective audio sources A, B. All of the first audio field 101 is considered a restricted zone and any part of the audio field 103 outside of this is considered an allowed zone. Using the user interface 16, the director/mixer may request enlargement of the second audio field 102 to an overlapping position on the first audio field 101. Referring to FIG. 9b disclosing an example of the user interface output 110, one form of modification performed in step 6.3 may involve jumping the overlapping part over to the other side of the first audio field 101, so that it is divided into first and second parts 102', 102".

The above examples assume that any part of the audio field which is not a restricted zone is an allowed zone. However, in some embodiments, one or more discrete allowed zones can be specifically defined within the overall audio field. The allowed zones may be available to all audio sources, or may be associated with just one audio source. In the case of the latter, an expansion zone may be defined on one or both sides of the restricted zone to permit a defined amount of enlargement.

Referring to FIG. 10 and FIG. 11, the FIG. 5 and FIG. 6 methods are modified. Referring to FIG. 10, in a first step 10.1, a first audio source is selected. In a second step 10.2, one or more restricted zones are defined for the selected first audio source, which may occupy part or all of the audio field. In a third step 10.3, one or more discrete allowed zones are defined, or may be inferred automatically. The process may be repeated for one or more further audio sources.

FIG. 11 shows the subsequent processing steps performed by the software application 40. In a first step 11.1, an input signal is received to move (which may comprise one or more of translation, rotation, enlargement etc.) the audio field of a second audio source. In step 11.2 it is determined if the input signal will result in an overlap with the restricted zone of the first audio source. If so, in step 11.3, the audio field of the second audio source is modified without overlap to occupy the next allowed zone. If not, in step 11.4, the audio field of the second audio source is modified in accordance with the input signal.

Figure 12B:
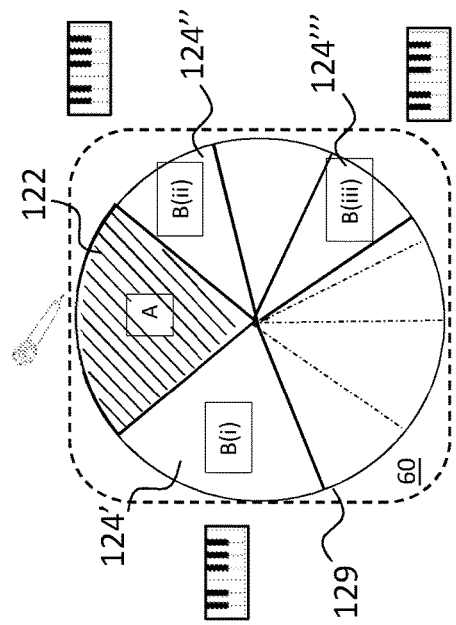
FIG. 12a and FIG. 12b are schematic top-plan views showing how enlargement of an audio field to overlap another audio field is processed where multiple allowed zones are provided according to embodiments.
Figure 12A:
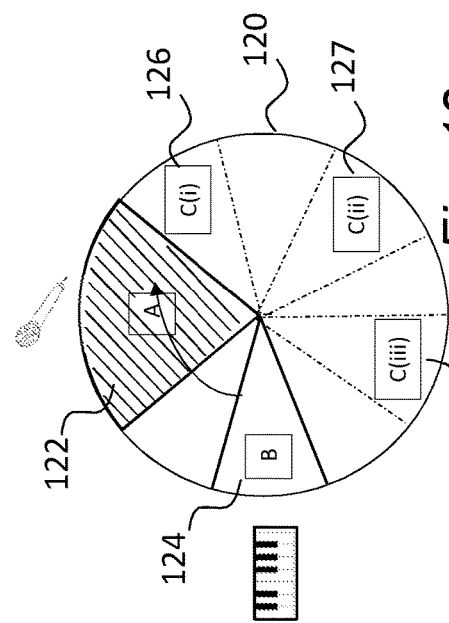

To illustrate, FIG. 12a shows in top plan view an overall spatial field 120 comprising first and second audio fields 122, 124 from respective audio sources A, B. All of the first audio field 122 is considered a restricted zone. A number of allowed zones 126, 127, 128 are defined within the remaining space, which are labelled C(i), C(ii) and C(iii) and which are spatially separate. FIG. 12b shows an example of the user interface output 129, that shows the result of an enlargement input signal. It will be seen that the second audio field 124 jumps over the first audio field 122 to occupy all of the first allowed zone 126 and then part of the second allowed zone 127, shown as 124', 124" and 124'''.

In some embodiments, the order in which allowed zones are occupied need not follow their spatial order. For example, a priority order may be set so that the first allowed zone 126 is occupied first, followed by the third allowed zone 128, and then the second allowed zone 127.

Figure 13B:
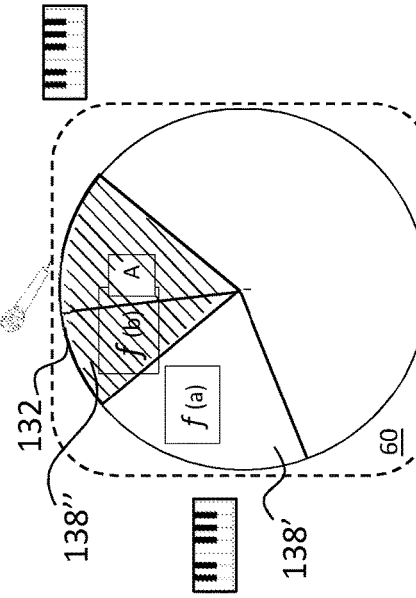
FIG. 13a and FIG. 13b are schematic top-plan views showing how enlargement of an audio field to overlap another audio field may be processed to assign different frequency ranges to respective zones according to embodiments.
Figure 13A:
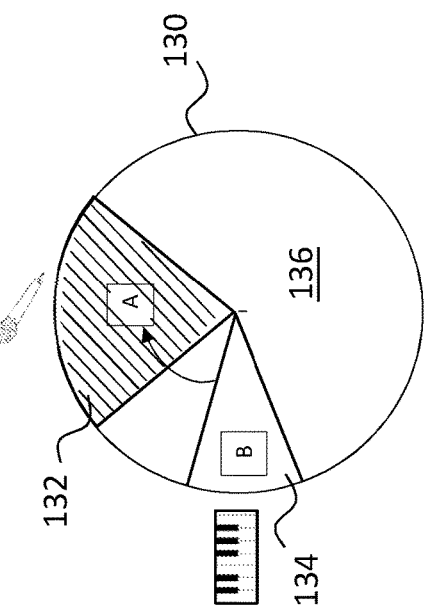

In some embodiments, one or more frequencies or frequency ranges may be associated with a restricted zone, so that when panning or enlargement of an audio field occurs, different frequency ranges may be used in different zones. For example, in FIG. 13a, a restricted zone 132 may be associated with a range of prohibited frequencies f(a) and so enlargement of a second audio field 134 may result in frequencies within the range f(a) being moved elsewhere (e.g. remaining in the first part of the zone 138' or jumping over to a distinct zone on the other side) whereas all other frequencies f(b) are allowed to overlap, as indicated by reference numeral 138". The frequencies may be determined from the signals themselves. For example, if a singer's frequency range is significantly different from another instrument, e.g. a guitar, then overlap may be permitted for the lower guitar frequencies but not those approaching the singer's higher frequency. In some embodiments, the behaviour of the spatial extent or movement may be dependent on the frequency ranges of the instruments.

Figure 14A:
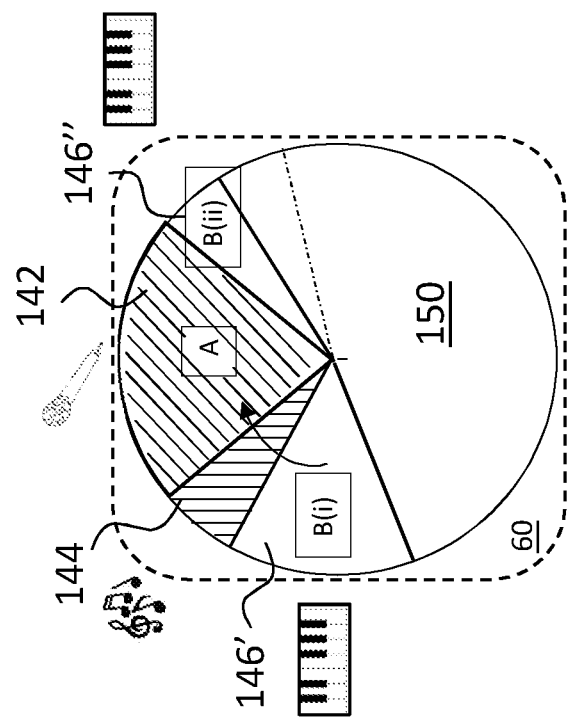
FIG. 14a and FIG. 14b are schematic top-plan views showing how enlargement of an audio field to overlap another audio field may be processed where an additional restricted zone is defined between the audio fields according to embodiments.

In some embodiments, one or more further restricted zones and/or one or more variable zones may be defined outside of a current audio field. For example, FIG. 11(a) FIG. 14a shows in top plan view an overall spatial field 140 comprising first and second audio fields 142, 146 from respective audio sources A, B. All of the first audio field 142 is considered a restricted zone. A further restricted zone 144 may be defined between the first and second audio fields 142. For example, this may represent a reserved area for backing vocals sung during only part of a performance. An expansion zone 148 may be defined adjacent the first audio field 142 which the first audio field is permitted to expand into as and when manually or automatically commanded. The expansion zone 148 may also be available for expansion by the second audio field 146, i.e. becoming in effect an allowed zone.

Figure 14B:
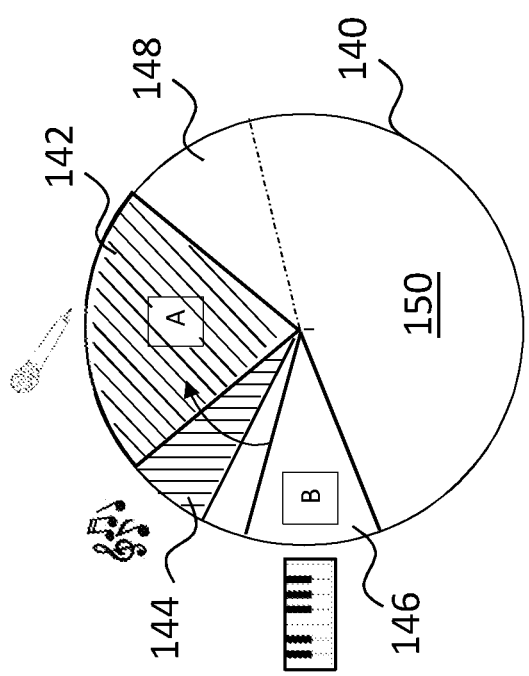

Referring now to FIG. 14b, responsive to an enlargement command, the second audio field 146 jumps over both restricted zones 142, 144 and into the expansion zone 148. The second audio field 146 becomes divided into two parts 146', 146".

In some embodiments, one or more of the audio fields may have an associated variable zone. A variable zone may be within the current audio field for an audio source, i.e. such that the audio source is present in the variable zone, but is outside, and typically adjacent, its restricted zone. It is considered variable, in the sense that the audio field of another audio source is permitted to overlap it which causes it to reduce in size by a corresponding amount so that there is substantially no overlap.

FIG. 15 shows an overview of the processing steps that are performed by the software application 40 to define one or more restricted and variable zones. In a first step 15.1, a first audio source is selected. In a second step 15.2, one or more restricted zones are defined for the selected first audio source, which may occupy part of the audio field. In a third step 15.3, one or more variable zones are defined occupying part of the audio field, typically adjacent the restricted zone. The process may be repeated for one or more further audio sources.

FIG. 16 shows an overview of the subsequent processing steps performed by the software application 40. In a first step 16.1, an input signal is received to move (which may comprise one or more of translation, rotation, enlargement etc.) the audio field of a second audio source. In step 16.2 it is determined if the input signal will result in an overlap with the restricted zone of the first audio source. If so, in step 16.3, the audio field of the second audio source is modified without overlap, which leads to step 16.4. In step 16.4, it is determined if the input signal will result in an overlap with a variable zone. If so, in step 16.5 the variable zone for the first audio source is reduced in correspondence to the amount (area or volume) of overlap. If there is no overlap in step 16.4, or after step 16.5 has been performed, the second audio field is modified accordingly and presented on the user interface 16.

To illustrate, FIG. 17a and FIG. 17b show a top-plan view of an overall spatial field 160 comprising first and second audio fields 162, 165 from respective audio sources A, B. Referring to FIG. 17a, a portion 163 of the first audio field 162 is defined as a restricted zone and an adjacent portion 164 is defined as a variable zone. FIG. 17b shows the result of an enlargement input signal. It will be seen that as the second audio field 165 begins to overlap the variable zone 164 of the first audio field 162, the variable zone shrinks or reduces by an amount corresponding to the overlap so that there is no overlap in the visualised output. Continued movement of the second audio field 165 into the restricted zone 163 will revert to the previous operation whereby the second audio field either returns to its original state, or jumps over the restricted zone into an allowable zone 166 on the other side.

In some embodiments, plural audio fields may be defined with both restricted zones and variable zones. Where the audio fields are moved relative to one another, the variable zones may overlap. In this situation, each variable zone may reduce in size by an equal amount so that the spatial reduction is shared by both audio fields. This is preferably the case where two audio fields are rotated towards one another simultaneously.

To illustrate, FIG. 18a and FIG. 18b show a top-plan view of an overall spatial field 170 comprising first and second audio fields 171, 174 from respective audio sources A, B. Referring to FIG. 18a, the portion 172 of the first audio field 171 is defined as a restricted zone and an adjacent portion 173 is defined as a variable zone. A portion 175 of the second audio field 174 is defined as a restricted zone and an adjacent portion 176 is defined as a variable zone. Responsive to a commanded movement of both first and second audio fields 171, 174 towards one another, overlapping of the variable zones 173, 176 causes each to reduce in equal amount. Effectively, the variable zones 173, 176 reduce by half the amount than would be the case if only one was moved. Continued movement of the second audio field 174 into the restricted zone 172 will revert to the previous operation whereby the second audio field either returns to its original state, or jumps over the restricted zone into an allowable zone 177 on the other side.

Figure 19:
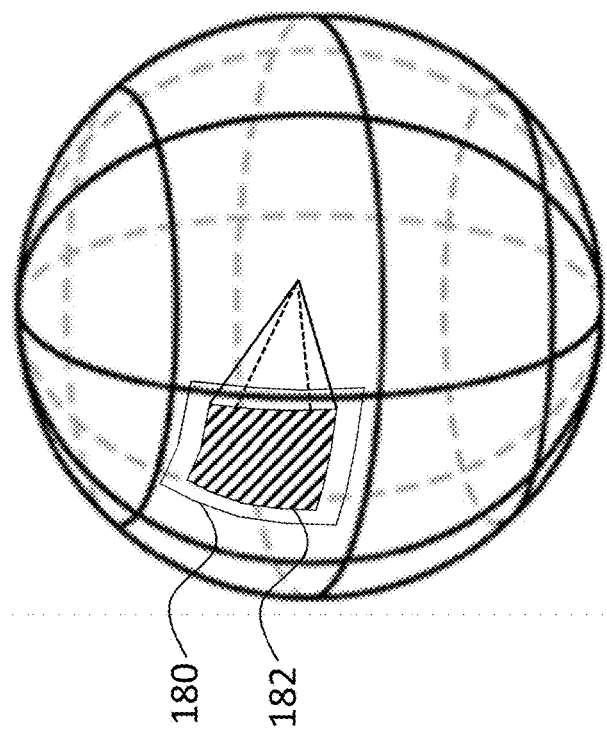
FIG. 19 is a schematic view showing how one or more embodiments can be applied in three-dimensions.

FIG. 19 shows in overview that the above-described methods for defining restricted and one or more of allowed, expansion and variable zones, may be applied in three dimensions instead of two. For example, the shaded zone 180 may represent a restricted zone and the outer zone 182 may represent a variable zone. The listening point is, i.e. user is positioned, in the middle of the sphere.

Figure 20:
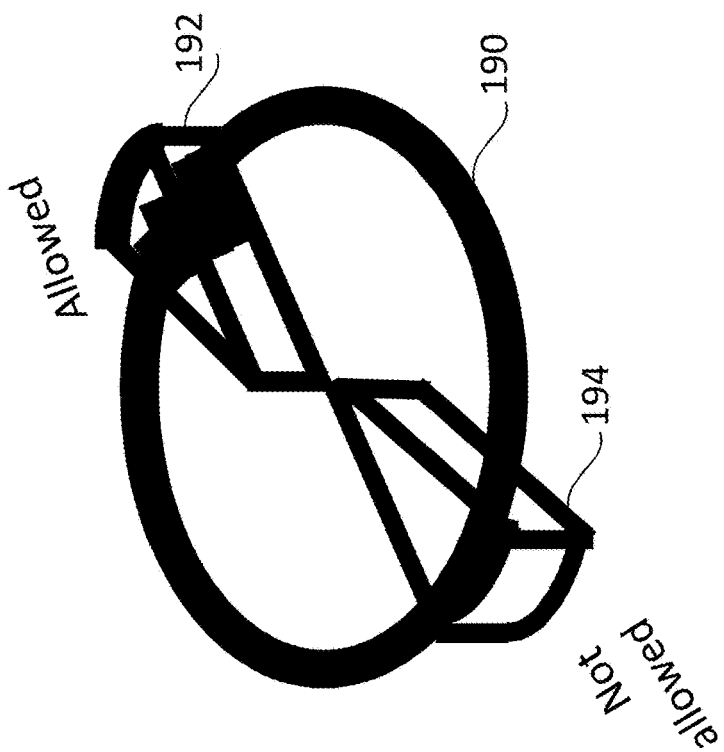
FIG. 20 is a schematic view of a three-dimensional scenario where a restricted zone is defined at a different level to that of an allowed zone.

FIG. 20 shows a three dimensional example, in which a reference plane 190 is defined; an allowed zone 192 may be defined above the reference plane and a restricted zone may be defined below the reference plane. The reference plane 190 may represent the level of a stage in a music or theatre performance, for example.

Figure 21:
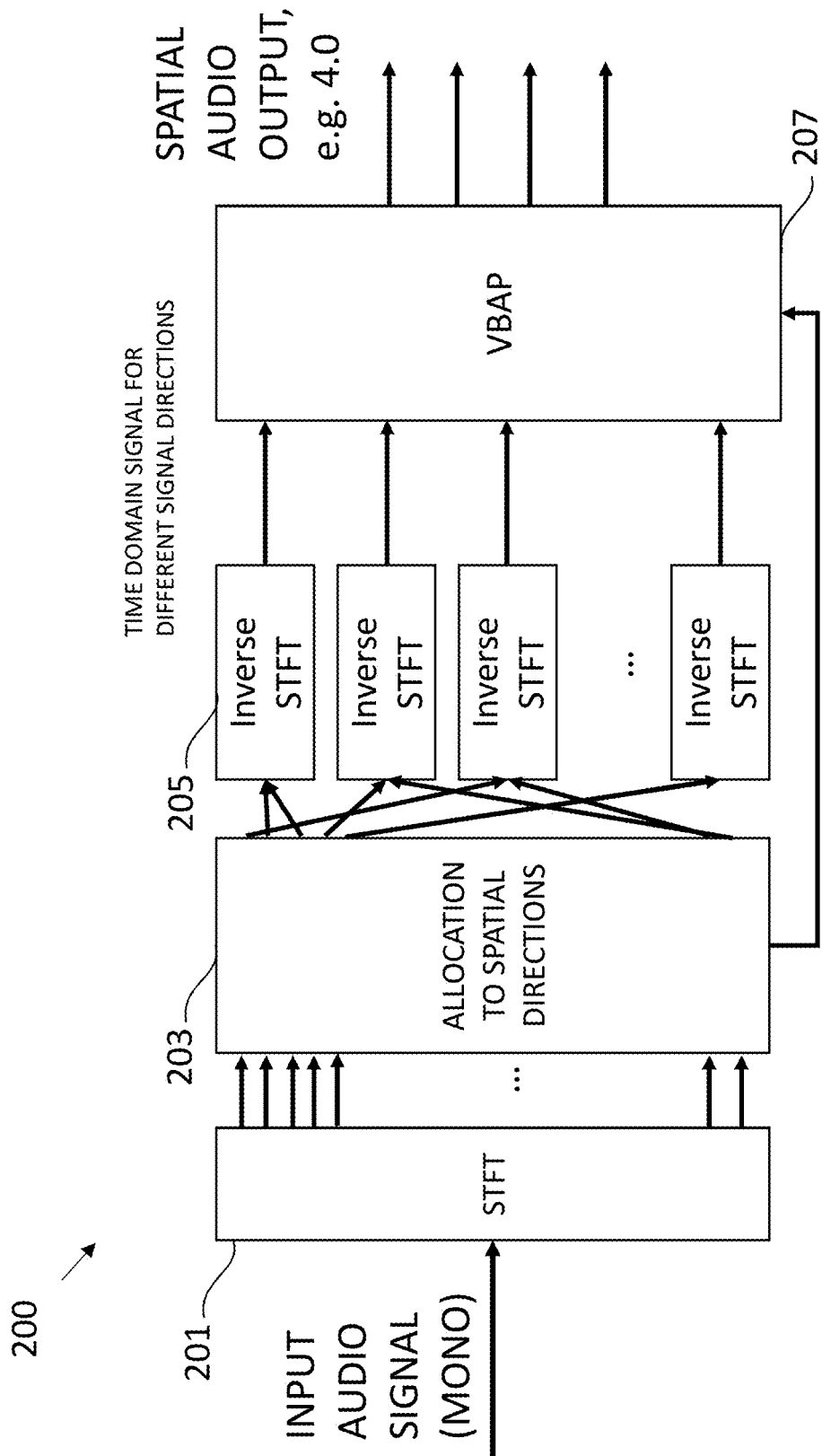
FIG. 21 is a block diagram of a system for spatial expansion control.

Spatial extent control may be performed using any known method, and reference is made by way of example to "*Synthesis of Spatially Extended Virtual Source with Time-Frequency Decomposition of Mono Signals*" by Tapani Pihlajamäki, Olli Santala and Ville Pulkki; J. Audio Eng. Soc., Vol. 62, No. 718, 2014. The contents of this reference are incorporated by reference. In summary, a method of a baseline spatial extent control divides the sound to frequency bands, and then spatially distributes the frequency components to N discrete spatial locations around the desired spatial spread, e.g. 90 degrees. FIG. 21 is a block diagram of a system 200 for spatial extent control. The system 200 comprises a short-time Fourier transform (STFT) module 200 which receives the input signal, e.g. a monaural signal, and divides the signal into frequency bands which are allocated to spatial directions using a module 203. Each is then applied to an inverse STET (ISTFT) which produces time domain signals for the different signal directions. These signals are then sent to a vector base amplitude panning module (VBAP) 207 which produces the spatial audio output.

It will be appreciated that the above described embodiments are purely illustrative and are not limiting on the scope of the invention. Other variations and modifications will be apparent to persons skilled in the art upon reading the present application.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. A method comprising:
receiving, by an apparatus, a plurality of audio signals representing audio from respective audio sources in a space;
defining, by the apparatus, for each audio source, a spatial audio field indicative of the propagation of its audio signals within the space;
defining, by the apparatus, for a first audio source, a restricted zone within its spatial audio field and a plurality of spatially-separated allowed zones outside of the restricted zone, the plurality of spatially-separated allowed zones having a priority order;
receiving, by the apparatus, a first control signal indicative of a change in the spatial audio field of a second audio source such that said spatial audio field is moved towards and overlaps a portion of the restricted zone of the first audio source; and
changing, by the apparatus, and in response to the first control signal, the spatial audio field of the second audio source such that there is no overlap with the restricted zone for at least some audio signal frequencies by at least moving a portion of the spatial audio field of the second audio source that would overlap with the portion of the restricted zone such that the portion of the spatial audio field of the second audio source, instead of the overlapping, occupies the plurality of spatially-separated allowed zones in the priority order.

2. The method according to claim 1, wherein the first control signal is received responsive to a user input for at least spatially repositioning and enlarging the spatial audio field of the second audio source.

3. The method according to claim 1, wherein the first control signal is received responsive to detection of a predetermined characteristic of the second audio source.

4. The method according to claim 1, wherein responsive to receiving the first control signal, at least part of the spatial audio field of the second audio source occupies the plurality of spatially-separated allowed zones on a side of the restricted zone in a direction of movement of the spatial audio field of the second audio source.

5. The method according to claim 4, wherein one of the plurality of spatially-separated allowed zones is a space adjacent the restricted zone in the direction of movement.

6. The method according to claim 1, further comprising:
defining, by the apparatus, for the first audio source a first variable zone adjacent the restricted zone; and
changing, by the apparatus, and in response to the first control signal, the spatial audio field of the second audio source to overlap at least part of the variable zone, wherein the first spatial audio field within said first variable zone is reduced in size.

7. The method according to claim 6, further comprising:
defining, by the apparatus, for the second audio source, a second variable zone, wherein the spatial audio fields within both the first and second variable zones are reduced in size.

8. The method according to claim 1, wherein:
the spatial audio field of the second audio source is changed such that there is no overlap with the restricted zone for all audio frequencies, or
wherein the restricted zone is defined with respect to one or more predetermined frequency ranges, and wherein the spatial audio field of the second audio source is changed such that audio signals within said predetermined frequency ranges do not overlap and audio signals with other frequencies not within the predetermined frequency ranges overlap.

9. The method according to claim 1, further comprising:
generating a user interface for output to a display system, the user interface presenting in graphical form the changed spatial audio field.

10. An apparatus comprising:
at least one processor and at least one memory including computer program code, which when executed by the at least one processor, cause the apparatus to at least:
receive a plurality of audio signals representing audio from respective audio sources in a space;
define for each audio source a spatial audio field indicative of the propagation of its audio signals within the space;
define for a first audio source a restricted zone within its spatial audio field and a plurality of spatially-separated allowed zones outside of the restricted zone, the plurality of spatially-separated allowed zones having a priority order;
receive a first control signal indicative of a change in the spatial audio field of a second audio source such that said spatial audio field is moved towards and overlaps a portion of the restricted zone of the first audio source; and
change, in response to the first control signal, the spatial audio field of the second audio source such that there is no overlap with the restricted zone for at least some audio signal frequencies by at least moving a portion of the spatial audio field of the second audio source that would overlap with the portion of the restricted zone such that the portion of the spatial audio field of the second audio source, instead of the overlapping, occupies the plurality of the spatially-separated allowed zones in the priority order.

11. The apparatus according to claim 10, wherein the first control signal is received responsive to a user input for at least spatially repositioning and enlarging the spatial audio field of the second audio source.

12. The apparatus according to claim 10, wherein the first control signal is received responsive to detection of a predetermined characteristic of the second audio source.

13. The apparatus according to claim 10, wherein responsive to receiving the first control signal, at least part of the spatial audio field of the second audio source occupies the plurality of spatially-separated allowed zones on a side of the restricted zone in a direction of movement of the spatial audio field of the second audio source.

14. The apparatus according to claim 13, wherein one of the plurality of spatially-separated allowed zones is a space adjacent the restricted zone in the direction of movement.

15. The apparatus according to claim 10, wherein the apparatus is further caused to at least:
define for the first audio source a first variable zone adjacent the restricted zone; and
change, in response to the first control signal, the spatial audio field of the second audio source to overlap at least part of the variable zone, wherein the first spatial audio field within said first variable zone is reduced in size.

16. The apparatus according to claim 6, wherein the apparatus is further caused to at least:
define, for the second audio source, a second variable zone, wherein the spatial audio fields within both the first and second variable zones are reduced in size.

17. The apparatus according to claim 10, wherein:
the spatial audio field of the second audio source is changed such that there is no overlap with the restricted zone for all audio frequencies, or
wherein the restricted zone is defined with respect to one or more predetermined frequency ranges, and wherein the spatial audio field of the second audio source is changed such that audio signals within said predetermined frequency ranges do not overlap and audio signals with other frequencies not within the predetermined frequency ranges overlap.

18. The apparatus according to claim 10, wherein the apparatus is further caused to at least:
generate a user interface for output to a display system, the user interface presenting in graphical form the changed spatial audio field.

19. A non-transitory computer-readable storage medium including program code which when executed by at least one processor causes operations comprising:
receiving a plurality of audio signals representing audio from respective audio sources in a space;
defining, for each audio source, a spatial audio field indicative of the propagation of its audio signals within the space;
defining, for a first audio source, a restricted zone within its spatial audio field and a plurality of spatially-separated allowed zones outside of the restricted zone, the plurality of spatially-separated allowed zones having a priority order;
receiving a first control signal indicative of a change in the spatial audio field of a second audio source such that said spatial audio field is moved towards and overlaps part a portion of the restricted zone of the first audio source; and
changing, in response to the first control signal, the spatial audio field of the second audio source such that there is no overlap with the restricted zone for at least some audio signal frequencies by at least moving a portion of the spatial audio field of the second audio source that would overlap with the portion of the restricted zone such that the portion of the spatial audio field of the second audio source, instead of the overlapping, occupies the plurality of spatially-separated allowed zones in the priority order.

\* \* \* \* \*